United States Patent [19]

Midavaine et al.

[11] Patent Number: 4,637,030
[45] Date of Patent: Jan. 13, 1987

[54] SWITCHING LASER

[75] Inventors: Thierry R. Midavaine; Michel M. Ouhayoun, both of Paris, France

[73] Assignee: SAT, Paris, France

[21] Appl. No.: 678,028

[22] Filed: Dec. 4, 1984

[30] Foreign Application Priority Data

Dec. 15, 1983 [FR] France ............................... 83 20097

[51] Int. Cl.$^4$ ............................................. H01S 3/097
[52] U.S. Cl. ........................................ 372/82; 372/97; 372/9; 372/55
[58] Field of Search ................... 372/9, 11, 87, 97, 82, 372/92

[56] References Cited

U.S. PATENT DOCUMENTS

| 3,395,367 | 7/1968 | Bell et al. | 372/94 |
|---|---|---|---|
| 3,586,998 | 6/1971 | Gould | 372/11 |
| 4,242,645 | 12/1980 | Siemsen | 372/57 |
| 4,539,685 | 9/1982 | Hart et al. | 372/11 |

OTHER PUBLICATIONS

Meyer et al.; "Passive Q-Switching by Heated $CO_2$", Infrared Physics (1978) vol. 18, No. 1, pp. 47–50 (Jan.).
Applied Physics B. Photophysics and Laser Chemistry, vol. B30, No. 2, Fevrier 1983, Heidelberg (DE), E. Arimondo et al.: "Repetitive Passive Q-Switching and Bistability in Lasers with Saturable Absorbers", pp. 57–77, *pp. 59–60, Paragraphe 1.1; Figures 2–4*.
IDEM IEEE Journal of Quantum Electronics, vol. QE-7, No. 8, out 1971, New York (US), D. R. Hall et al.: "High-Efficiency Driven Q Switching of the $CO_2$ Laser Using the Stark Effect in Molecular Gases", pp. 427–429, *en entier*.
Soviet Physics JETP, vol. 34, No. 2, Fevrier 1972, New York (US), Yu. V. Brzhazovskii et al.: "Theoretical and Experimental Investigation of Radiation Pulsation from a $CO_2$ Laser with a Nonlinear Absorbing Cell", pp. 265–270, paragraphes 1–2*.

Primary Examiner—Leon Scott, Jr.
Attorney, Agent, or Firm—Stevens, Davis, Miller & Mosher

[57] ABSTRACT

A switching laser comprising, in a cavity, a cell of an amplification gas and a cell of an absorption gas, means for exciting said amplification gas and means for exciting said absorption gas. Said means for exciting the absorption cell comprise a radio frequency AC voltage source pulsed at a certain rate. The laser is namely used for infrared detection.

5 Claims, 4 Drawing Figures

SWITCHING LASER

BACKGROUND OF THE INVENTION

1. Field of the Invention

The present invention relates to switching laser comprising, in a cavity, a cell of an amplifying gas and a cell of an absorption gas, means for exciting the amplification gas and means for exiting the absorption gas.

2. Description of the Prior Art

When a cell containing an absorbent gas is placed in the cavity of a laser, the normally continuous laser emission may be converted into a pulsed emission, providing that the absorber is a saturable absorber whose saturation parameter is comparable to the intensity flowing in the laser.

This conversion has been designated as "passive Q-switching" where Q is the quality coefficient.

For pulsing for example a $CO_2$ laser, as early as 1967 the use of sulphur hexafluoride, propylene, formic acid, and even carbonic gas, or a mixture containing this gas, have been proposed depending on the wave length of the laser emission.

When carbon gas is used as pulsing agent for a $CO_2$ laser, the laser absorption transition and emission transition bring into play the same vibratory levels. Furthermore, the pulsing carbonic gas must be heated for populating the absorption level, this gas not being absorbent at its fundamental level.

It should be mentioned here that the passive switching of a $CO_2$ laser by the same $CO_2$ does not require a network in the cavity since, not only for amplification but also for absorption, the transition takes place between the same two levels, and the problem of coincidence of the emission and absorption spectral lines does not then arise.

Generally, the rate of the pulses of passive switching laser depends on the nature of the switching, or pulsing, gas, on its absorption coefficient, on its temperature, on its pressure and on the light intensity of the laser.

The passive switching of a laser is explained in the following way:

A spontaneous and stimulated emission arrives on the absorbent gas. This latter first of all resists the bleaching of this emission, particularly by transfer of collision energy at the absorption level. The laser emission is thus prevented. When the spontaneous and stimulated emission becomes sufficiently intense and finally succeeds in passing through the absorber, this emission introduces a transparency state, the population at the two levels of the transition of the absorbent being the same, and the emission becomes a laser emission. The laser then releases all its energy; during the pulsing, and after relaxation of the molecules, the lower level of the transition of the absorber is repopulated until it becomes opaque again and this phenomen continues again and so on.

The construction of passive switching lasers has been known for a long time, which comprise, in a cavity, an amplification cell and an absorption cell, containing for example $CO_2$ or a mixture of $CO_2$ and another gas, a DC power source for amplification and a heating source for the absorption.

However, the rate of the pulses emitted by passive switching lasers constructed at the present is not strictly constant, a random shift or jitter between the successive pulses occurring from one period to another because of the random start up of the laser emission.

Although it has already been proposed to regulate the average rate of the pulses of a passive switching laser by causing the light intensity of a laser for example, to vary, this regulation by varying the intensity has never overcome this jitter question.

It is this question which the present invention proposes dealing with.

The document Applied Physics B. Photophysics and Laser Chemistry, vol. 830, no. 2, February 1983, Heidelberg (DE), E. Arimondo et al: "Repetitive passive Q-switching and bistability in lasers with saturable absorbers", pages 57–77, it is true already teaches the exciting of the gas of an absorption cell by using a radio frequency DC voltage source. However, the authors of the article whose title is moreover significant, have never sought to resolve this question of jitter. These authors were in fact only concerned with the transitory phenomena due to the sudden variations of the populations of a molecule taking part in an absorbent transition for the laser radiation, inducing power modulation of the laser which is damped. In other words, they analyzed how the switching mode was reached, where the damping times become infinite. But the work reported in this document remained limited to passive switching lasers.

The problem of controlling the switching of lasers remains then unsolved and it is this problem which the applicant has sought to solve.

SUMMARY OF THE INVENTION

For this, the present invention provides a switching laser comprising, in a cavity, an amplification gas cell and an absorption gas cell, means for exciting the amplification gas and means for exciting the absorption gas, wherein the means for exciting the absorption gas comprise a radio frequency AC voltage source, pulsed at a predetermined rate.

The applicant has then discovered that it was possible to control the switching laser, that is to say to control and synchronize the rate of its switching in an active way by controlling the rate of the pulses from the source exciting the absorption cell.

The jitter phenomenon in the laser emission is then only limited by that of the pulses of the source, that is to say that it is negligible.

In a preferred embodiment of the laser of the invention, the power of the voltage source is controlled. By controlling this power, and of course the pressure of the gas, it is possible to control the population of the absorption level of the absorbent gas, which must not be too excessive so that saturation occurs.

It will be noted that it is sufficient to interrupt the radio frequency exciting so as to interrupt the absorption in the laser and that its emission becomes continuous, at its nominal power.

Preferably, the gases in the amplification and absorption cells are the same, with the advantages already mentioned above, namely systematic coincidence of the emission and absorption spectral lines and therefore no need for a network in the cavity, population of the lower level of the common transition.

BRIEF DESCRIPTION OF THE DRAWINGS

The present invention will be better understood from reading the following description of a preferred embodiment of the laser of the invention with reference to the accompanying drawings in which.

DESCRIPTION OF THE PREFERRED EMBODIMENT

Figure 1:
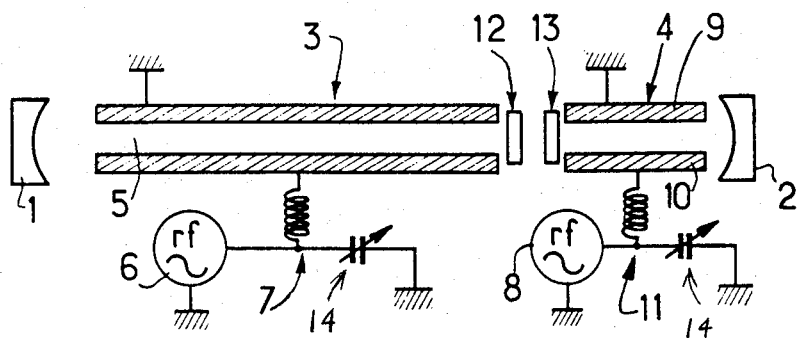
FIG. 1 shows a simplified diagram of the laser.

The electric switching laser shown schematically in FIG. 1 comprises, in an external metal case not shown closed at both its ends by two mirrors 1 and 2, and forming a resonant cavity of a length of a few tens of centimeters, a first so called amplification cell 3 and a second so called absorption cell 4.

With the first amplification cell 3 is associated a power supply source for the electric pumping and for the laser emission of this cell.

Although, in the example considered, this pumping is obtained from a guide 5 excited by a transverse radio frequency field for example at 80 MHz, fed from a source 6 and an impedance matching circuit 7, it would also have been possible to provide other pumping means.

With the second absorption cell 4 is associated another exciting source 8, in this case a second radio frequency AC voltage at 80 MHz, whose amplitude is pulsed in a way known per se at a given rate. It should be noted that the excitation frequencies of the two cells do not necessarily need to be the same.

Two electrodes 9, 10 are connected respectively to the two terminals of source 8, electrode 10 through a matching impedance 11, and are disposed on the external wall of cell 4 substantially coextensive therewith. It is then a question here of transverse excitation, but longitudinal excitation could also be provided. The internal walls of the cells may also form a guide a few centimeters in length.

In so far as impedance 11 is concerned, its value may only be approximative, for the impedance of the plasma varies greatly depending on the pressure. In the case of a cell of a capacity of 9 pF, the impedance will comprise a tuning inductance of 0.44 micro H, and a tuning capacitor 14 adjusted for lowering the standing wave rate to a minimum.

The ends of the amplification cell 3 and of the absorption cell 4 turned towards each other are closed by two anti reflecting windows 12, 13.

Structurally, cells 3 and 4 may be formed by an assembled, sandwiched or lid, technology or advantageously by the same monolithic technology, in accordance with French patent No. 82.12 147 in the name of the applicant.

In the example considered, the active molecule of the saturable absorbent gas is carbonic gas $CO_2$, although other molecules could have been adopted. Still in this example, the active molecule of the laser gas is also $CO_2$, but the invention would apply just as well to other molecular lasers.

Figure 2:
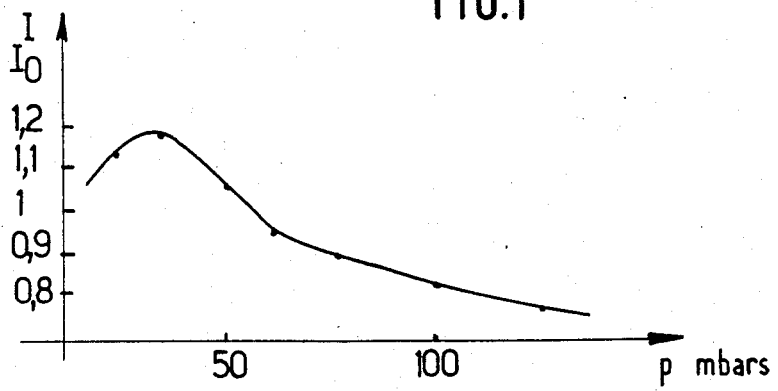
FIG. 2 shows the curve of variation of the transmission coefficient as a function of the pressure of the absorption gas, for continuous radio frequency exciting.

The curve of FIG. 2 illustrates the variation of the transmission coefficient $I/I_o$ of $CO_2$ as a function of its pressure, for continuous radio frequency excitation. It results from an extra-cavity experiment, the cell being illuminated by a laser beam of 650 mW, with an excited length of about 20 cm. Up to a pressure of about 40 mbars, $CO_2$ causes first of all an amplification. Beyond, the gas is very absorbent and at about 60 mbars, the transmission coefficient is about 0.9. It has been discovered that the power of the radio frequency excitation did not modify appreciably the absorption coefficient, once the plasma was excited.

Under pulsed excitation of the absorption cell, and during a given pulse of this excitation, absorption becomes preponderant beyond a given gas pressure. Furthermore, this pressure must not exceed a certain threshold, beyond which the plasma could not be excited. This range of admissible pressures extends substantially from 20 mbars to 50 mbars.

Figure 3:
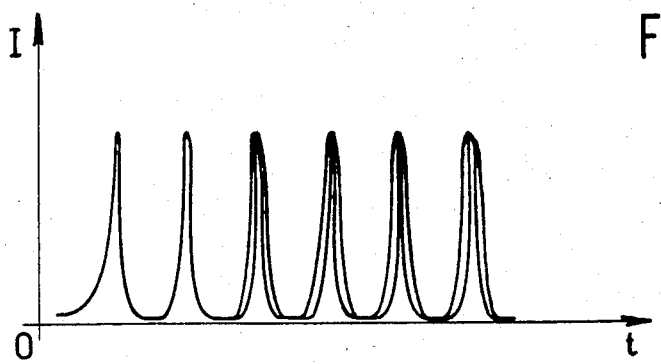
FIG. 3 shows the variation in time of the optical signal of the laser, for a continuous radio frequency exciting.

FIG. 3 shows, with several superimposed scanning periods, the optical signal of the passive switching laser of FIG. 1, the absorption cell 4 being subjected to continuous radiofrequency exitation, in the case considered with a $CO_2$ pressure of 30 mbars, optimized for the geometry of a cell of $4 \times 4 \times 50$ mm$^3$.

Figure 4:
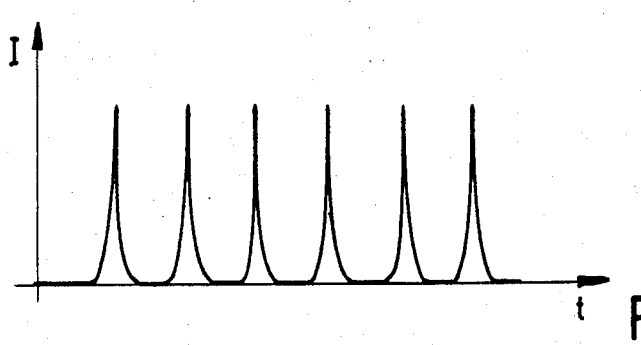
FIG. 4 shows the variation in time of the optical signal of the laser, for a pulsed radio frequency excitation.

As in the prior art lasers, for example with an absorption cell using sulphur hexafluoride $SF_6$, the jitter phenomenon occurs and is displayed on an oscilloscope by recording several scanning periods. In FIG. 4 is further shown the optical signal of this laser, but with pulsed excitation of the absorption cell at a 100 kHz. The thus active switching of the laser is latched to the excitation pulses without any noticeable jitter phenomenon. However, a phase shift takes place between the pulses of the optical signal and those of the electric signal, which may moreover vary depending on the operating conditions. Experience has further shown that this latching could continue up to a rate of about 200 kHz of the pulses of the electric signal and from a rate of 10 kHz.

More precisely, at a rate of a 100 kHz of the electric signal the mean light power of the laser is five times less than its peak power, this latter being 2.5 times greater than the power of the laser under continuous radio frequency excitation.

It should be noted that when the power of the source for exciting the absorption cell increases, the Q-switch rate decreases.

The advantages of the active switching laser described above are the following:

the $CO_2$ electric switching does not depend on the emission spectral line;

passive switching operation occurs close to the center of the gain profile of the emission spectral line considered;

a network is not required in the resonant cavity;

the laser may also operate with isotopic varieties of the same molecule, providing that these latter occupy both the amplification cell and the absorption cell;

control of the switching rate is easy, this rate being independent of the emission power of the laser;

the switched mode may be interrupted at any time and very easily without appreciably modifying its continuous operating power;

the absorption cell may be used, with a lower power radio frequency excitation, as regulator of the emission power of the laser under continuous operation.

The laser such as it has just been described may have numerous applications, particularly in the field of active infrared detection.

What is claimed is:

1. A switching laser comprising, in a single cavity, a cell of an amplification gas and a cell of an absorption gas, means for exciting the amplification gas and means for exciting the absorption gas, said means for exciting the absorption gas comprising a low power radio frequency AC voltage source pulsed at a predetermined rate so as to interrupt absorption in said laser such that laser emission becomes continuous at said predetermined rate.

2. The laser as claimed in claim 1, wherein the gases of the amplification and absorption cells are the same.

3. The laser as claimed in claim 1, wherein the gas of the absorption cell is $CO_2$.

4. The laser as claimed in claim 1, wherein the molecules of the gases of said amplification and absorption cells are isotopic varieties of the same molecule.

5. The laser as claimed in claim 1, wherein said voltage source is pulsed at a rate substantially between 10 and 200 kHz.

* * * * *